(12) United States Patent
Fukuyama et al.

(10) Patent No.: US 6,370,918 B2
(45) Date of Patent: Apr. 16, 2002

(54) PRESS FORMING MACHINE FOR OPTICAL DEVICES

(75) Inventors: Satoshi Fukuyama; Toshihisa Kamano; Isao Matsuzuki, all of Numazu; Hiroshi Murakoshi, Mishima, all of (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 09/783,037

(22) Filed: Feb. 15, 2001

(30) Foreign Application Priority Data

Feb. 15, 2000 (JP) ........................ 2000-036708
Feb. 23, 2000 (JP) ........................ 2000-046232

(51) Int. Cl.$^7$ ............................................. C03B 11/12
(52) U.S. Cl. .................. 65/319; 65/268; 65/286; 425/174.4
(58) Field of Search ........................ 65/319, 268, 286; 425/174.4

(56) References Cited

U.S. PATENT DOCUMENTS 5,782,946 A * 7/1998 Komiyama et al. ........... 65/102
5,938,807 A * 8/1999 Komiyama et al. ........... 65/29.12

FOREIGN PATENT DOCUMENTS

| JP | 5-186230 | | 7/1993 |
| JP | 8-245228 | * | 9/1996 |

* cited by examiner

Primary Examiner—Christopher A. Fiorilla
(74) Attorney, Agent, or Firm—Pillsbury Winthrop LLP (57) ABSTRACT

A press forming machine for optical devices which manufactures, an optical device from silica glass with a high glass transition point. A transparent quartz tube surrounds an upper die unit, lower die unit, fixed shaft, and moving shaft to form an airtight chamber inside it. Infrared lamps are arranged along the outer surface of the transparent quartz tube, and a reflecting mirror is arranged behind the infrared lamps. A cooling gas jacket is formed to cover the rear surface of the reflecting mirror. The inner-diameter side wall surface of the jacket and the reflecting mirror have many through holes. A cooling gas is sprayed from the interior of the jacket toward the transparent quartz tube through the through holes, thereby cooling the reflecting mirror, quartz bulbs constituting the outer surfaces of the infrared lamps, and the transparent quartz tube.

6 Claims, 5 Drawing Sheets

PRESS FORMING MACHINE FOR OPTICAL DEVICES

CROSS-REFERENCE TO RELATED APPLICATIONS

This application is based upon and claims the benefit of priority from the prior Japanese Patent Applications No. 2000-036708, filed Feb. 15, 2000; and No. 2000-046232, filed Feb. 23, 2000, the entire contents of which are incorporated herein by reference.

BACKGROUND OF THE INVENTION

The present invention relates to a press forming machine for optical devices which manufactures a glass optical device such as a lens, prism, and optical communication component by press forming.

Figure 5:
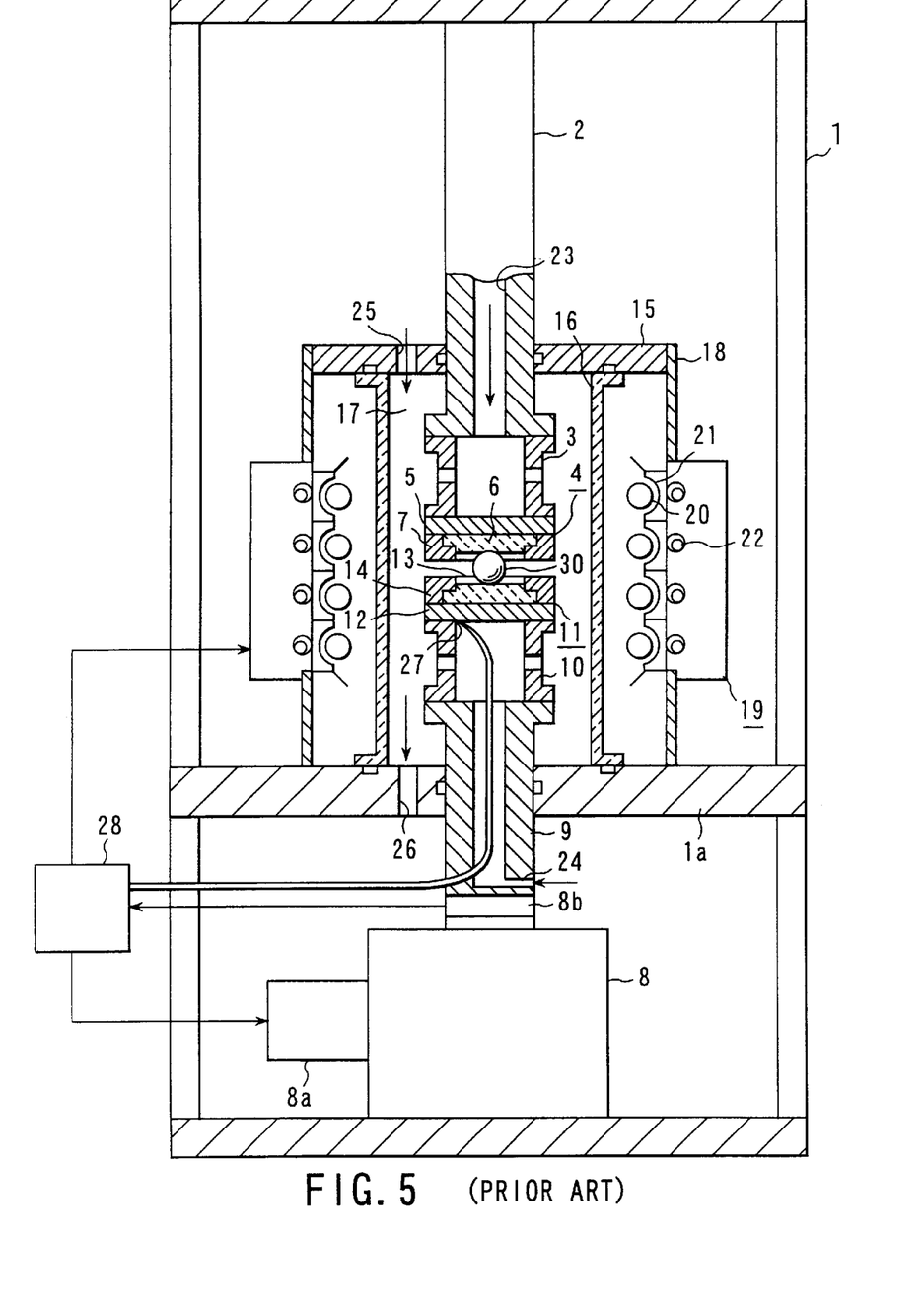
FIG. 5 is a schematic view of an example of a conventional press forming machine for optical devices.

FIG. 5 is a schematic view showing the structure of a conventional press forming machine for optical devices disclosed in Jpn. Pat. Appln. KOKAI Publication No. 5-186230.

A fixed shaft 2 extends downward from the upper portion of a frame 1, and an upper die unit 4 is attached to the lower end face of the shaft 2 with a heat insulating block 3 made of a ceramic material. The upper die unit 4 is comprised of a die plate made of metal 5, an upper die 6 made of ceramic (or sintered hard alloy), and a fixed die 7. The fixed die 7 fixes the upper die 6 to the die plate 5 and forms part of a die.

A driving unit 8 (a screw jack in this example) is provided to the lower portion of the frame 1. The driving unit 8 has a servo motor 8a as a driving source and converts rotation of the servo motor 8a into a thrust of linear motion. A moving shaft 9 is attached to the distal end of the driving shaft of the driving unit 8 with a load cell 8b. The moving shaft 9 extends upward to oppose the fixed shaft 2. The speed, position, and axial load of the moving shaft 9 are controlled by a program input to a controller 28, so the moving shaft 9 can move in the vertical direction.

A lower die unit 11 is attached to the upper end face of the moving shaft 9 with a ceramic heat insulating block 10. The lower die unit 11 is comprised of a die plate 12 made of metal, a lower die 13 made of ceramic (or sintered hard alloy), and a moving die 14. The moving die 14 fixes the lower die 13 to the die plate 12 and forms part of a die.

The fixed shaft 2 extends through an opening formed at the central portion of an upper plate 15. The upper plate 15 is driven in the vertical direction by a driving unit (not shown). An O-ring is fitted in the opening of the upper plate 15, and the upper plate 15 can slide in the vertical direction with a portion between it and the outer surface of the fixed shaft 2 being kept airtight.

The moving shaft 9 extends through an opening formed at the central portion of a lower plate 1a. The lower plate 1a is fixed to the frame 1. An O-ring is fitted in the opening of the lower plate 1a, and the moving shaft 9 can slide in the vertical direction with a portion between it and the inner surface of the lower plate 1a being kept airtight.

The upper and lower die units 4 and 11 which form a pair, the heat insulating blocks 3 and 10, the lower end of the fixed shaft 2, and the upper end of the moving shaft 9 are surrounded by a cylindrical member made of silica glass (transparent quartz tube 16). The upper end face of the transparent quartz tube 16 abuts against the lower surface of the upper plate 15, and an O-ring is mounted in that portion of the upper plate 15 which comes into contact with the transparent quartz tube 16 to maintain airtightness. Similarly, the lower end face of the transparent quartz tube 16 abuts against the upper surface of the lower plate 1a, and an O-ring is mounted in that portion of the lower plate 1a which comes into contact with the transparent quartz tube 16 to maintain airtightness. Hence, a forming chamber 17 which is airtight against the outside is formed inside the transparent quartz tube 16.

An outer tube 18 is arranged to surround the transparent quartz tube 16. The upper end of the outer tube 18 is connected to the outer surface of the upper plate 15, and the lower end of the outer tube 18 is in contact with the upper surface of the lower plate 1a. A lamp unit 19 is mounted at the middle stage of the outer tube 18. The upper and lower die units 4 and 11 located inside the transparent quartz tube 16 are heated by radiation from the lamp unit 19. The lamp unit 19 is comprised of infrared lamps 20, a reflecting mirror 21 arranged behind the infrared lamps 20, a water-cooled pipe 22 for cooling the reflecting mirror 21. Both the infrared lamps 20 and reflecting mirror 21 are formed by stacking in a plurality of stages ring-like components each constituted by mating two semicircular arcuate elements, to form a cylindrical shape as a whole.

The fixed shaft 2, moving shaft 9, and upper plate 15 respectively have gas supply paths 23, 24, and 25. The lower plate 1a has an exhaust port 26. An inert gas is supplied into the forming chamber 17 at a predetermined flow rate through the gas supply paths 23, 24, and 25, and is discharged through the exhaust port 26, to maintain the interior of the forming chamber 17 in an inert gas atmosphere and to cool the upper and lower die units 4 and 11.

A thermocouple 27 is attached to the rear surface of the die plate 12. The thermocouple 27 detects the temperature of the lower die unit 11.

When manufacturing an optical device of ordinary optical glass (with a glass transition point of 800° C. or less), press forming is performed at a temperature of about 800° C. by using the machine as shown in FIG. 5.

For example, a stepper lens used in a semiconductor manufacturing process requires a high ultraviolet transmittance, and accordingly silica glass is used to form it. In a V-groove board used for an optical communication V-groove connector, silica glass is used so that the thermal expansion coefficient of the optical communication V-groove connector coincides with that of a silica glass optical fiber and optical waveguide. This silica glass optical device is conventionally manufactured by grinding and polishing processes. Therefore, to manufacture such an optical device requires a long period of time and high cost.

If such a silica glass optical component is to be manufactured by press forming in order to reduce the manufacturing cost, as the silica glass has a high glass transition point and a high forming temperature of about 1,300° C. to 1,600° C., the following various problems arise in the performance of the machine at elevated temperature:

(a) Since the temperature of the transparent quartz tube 16 increases, the transparent quartz tube 16 may deform, the seal packings in contact with the two ends of the transparent quartz tube 16 may be damaged, and a reaction product may attach to the inner and outer surfaces of the transparent quartz tube 16.

(b) Since the temperature of the quartz bulbs surrounding the filaments of the infrared lamps 20 increases, the quartz bulbs deform.

(c) Since the temperature of the reflecting mirror 21 arranged behind the infrared lamps 20 increases, the reflecting coating film (e.g., gilt finish film) applied to the reflecting surface peeks off.

(d) Since the temperature of the terminal portions of the infrared lamps 20 increases to 300° C. or more, the molybdenum foils and pins of the sealing portions of the terminals of the infrared lamps 20 are oxidized. This shortens the service life of the infrared lamps 20.

Furthermore, to increase the forming temperature to 1,000° C. or more is not easy with the conventional forming machine due to the following reason.

In the conventional press forming machine for optical devices, as shown in FIG. 5, the lamp unit 19 is arranged outside the transparent quartz tube 16 to surround the pair of upper and lower die units 4 and 11. The pair of upper and lower die units 4 and 11 and a preform 30 are heated by infrared rays radiated from the lamp unit 19. Since most of the infrared rays are transmitted through the preform 30 made of silica glass, the preform 30 is mainly heated by the heat conduction from the upper and lower dies 6 and 13 and from the ambient gas in the forming chamber 17. Therefore, the output from the lamp unit 19 must be increased larger than in the conventional case. Also, the temperature of the ambient gas in the forming chamber 17 must be increased to a value near a forming temperature. The conventional forming machine, however, does not have sufficiently high heat insulating properties for the interior of the forming chamber, and it is accordingly not easy to increase the temperature of the ambient gas in the forming chamber to 1,000° C. or more.

BRIEF SUMMARY OF THE INVENTION

The present invention has been made in view of the problems of the conventional press forming machine for optical devices as described above. It is the first object of the present invention to provide a press forming machine for optical devices which does not cause damage to components constituting the machine even when the forming temperature is set to 1,000° C. or more and can accordingly be used for press-forming a material with a high glass transition point such as silica glass. It is the second object of the present invention to provide a press forming machine for optical devices which has excellent heat insulating properties for the interior of the forming chamber and allows the temperature of the atmospheric gas in the forming chamber to reach a value near the glass transition point of silica glass within a short period of time.

According to the present invention, there is provided a press forming machine for optical devices, which heats a material to be formed and thereafter forms the material, thereby manufacturing an optical device, comprising:

a pair of upper and lower press dies for forming the material;

a pair of upper and lower shafts for respectively supporting the press dies from behind;

a cylindrical member surrounding the pair of press dies and distal ends of the shafts to form an airtight chamber therein, the cylindrical member being made of a material transparent to infrared rays;

infrared lamps arranged along an outer surface of the cylindrical member to surround the pair of press dies;

a reflecting mirror arranged behind the infrared lamps to form a cylindrical shape as a whole; and a jacket attached to cover a rear surface of the reflecting mirror and supplied with a cooling gas, wherein the reflecting mirror has a plurality of through holes through which the cooling gas is sprayed from the jacket toward the outer surface of the cylindrical member.

With the press forming machine for optical devices according to the present invention, the reflecting mirror, infrared lamps (more specifically, quartz bulbs for housing filaments), and cylindrical member are cooled by spraying the cooling gas from the rear surface of the reflecting mirror, so that a temperature increase in these constituent components is suppressed. Even when the press forming temperature is set to 1,000° C. or more, these constituent components can be prevented from deforming or being damaged. As a result, an optical component can be manufactured from silica glass with a high glass transition point by press forming.

Preferably, the cooling gas sprayed toward the outer surface of the cylindrical member is recovered from both ends of the cylindrical member. The recovered cooled gas is cooled by a heat exchanger, and is discharged outside the machine. Hence, hot gas is prevented from being discharged from the machine, and the atmosphere in a room where the machine is installed can be maintained at a good state.

The cooling gas cooled by the heat exchanger can be circulated in the jacket again. This method is particularly effective, when the machine is installed in a clean room, in order to maintain the atmosphere in the clean room. This method is also effective when a gas other than air, e.g., an inert gas, is used as the cooling gas.

Preferably, a terminal chamber for housing terminal portions of the infrared lamps is provided in the press forming machine for optical devices of the present invention. The cooling gas is supplied into the terminal chamber as well, thereby cooling the terminal portions of the infrared lamps. As a result, damage to the infrared lamps can be prevented, and the service life of the infrared lamps can be prolonged.

According to the present invention, there is also provided a press forming machine for optical devices, which heats a material to be formed and thereafter forms the material, thereby manufacturing an optical device, comprising:

a pair of upper and lower press dies for forming the material;

a pair of upper and lower shafts for respectively supporting the press dies from behind;

a pair of upper and lower heat insulating members inserted between distal end faces of the respective shafts and rear surfaces of the press dies to decrease a heat flux flowing out from the press dies through the shafts;

a cylindrical member surrounding the pair of press dies, the pair of heat insulating members, and distal ends of the shafts to form an airtight chamber therein, the cylindrical member being made of a material transparent to infrared rays;

upper and lower plates respectively connected to upper and lower ends of the cylindrical member and having through holes at central portions thereof through which the shafts extend slidably through seal members;

infrared lamps arranged along an outer surface of the cylindrical member to surround the pair of press dies;

a first reflecting mirror arranged behind the infrared lamps to have a cylindrical shape as a whole;

a second reflecting mirror arranged to surround the cylindrical member and occupying a range extending from an upper end of the first reflecting mirror to a lower surface of the upper plate to form a cylindrical shape as a whole; and a third reflecting mirror arranged to surround the cylindrical member and occupying a range extending from a lower end of the first reflecting mirror to an upper surface of the lower plate to form a cylindrical shape as a whole.

According to the press forming machine for optical devices of the present invention, since the second and third reflecting mirrors are arranged above and under the first reflecting mirror in the above manner, heat radiated from the vicinities of the distal ends of the pair of upper and lower shafts through the cylindrical member is reflected by the second and third reflecting mirrors to return to the shafts it is radiated from. Thus, heat dissipated outside the forming chamber decreases, so that the heat insulating properties in the forming chamber are improved. As a result, the atmosphere temperature in the forming chamber can increase to reach a value near the glass transition point of silica glass quickly and efficiently.

Other than formation of optical devices, the above method can also be applied to forming or sintering a metal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

Figure 1:
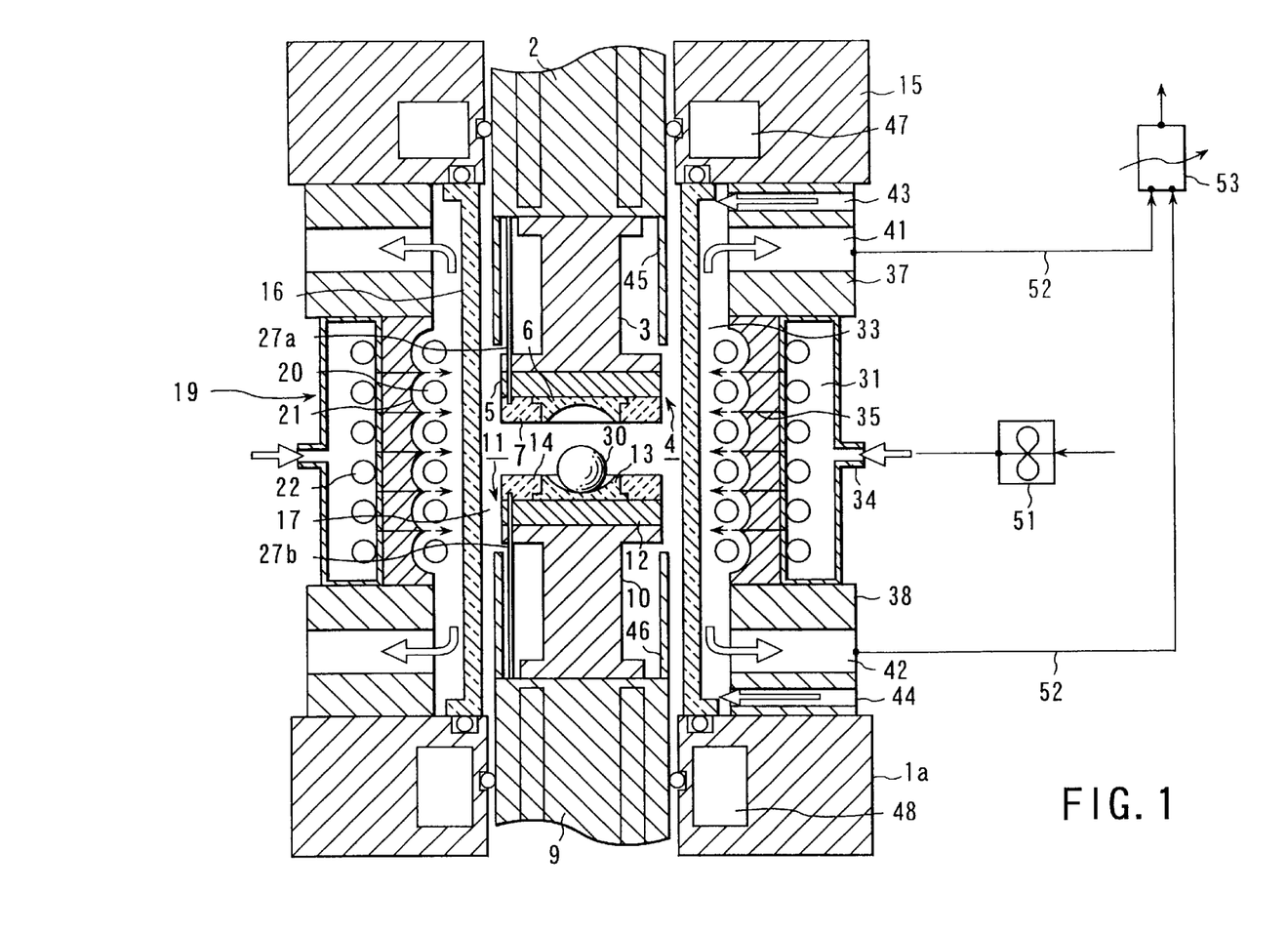
FIG. 1 shows the schematic view of the main part of a press forming machine for optical devices according to an embodiment of the present invention.

FIG. 1 shows a press forming machine for optical devices according to an embodiment of the present invention.

Referring to FIG. 1, reference numeral 30 denotes a preform (material to be formed); 4, an upper die unit (upper die); 11, a lower die unit (lower die); 2, a fixed shaft (upper shaft); 9, a moving shaft (lower shaft); 3 and 10, heat insulating blocks (heat insulating members); 16, a transparent quartz tube (cylindrical member); 17, a forming chamber; 20, infrared lamps; 21, a reflecting mirror; 31, a cooling gas jacket; and 35, through holes.

The characteristic feature of the press forming machine for optical devices according to the present invention resides in the infrared lamps 20 and reflecting mirror 21 arranged along the outer surface of the forming chamber 17, and a structure around them. Except for this, the arrangement of the present invention is basically the same as the conventional machine (FIG. 5) described earlier. Hence, portions of the present invention that are common with the conventional machine will be partly omitted.

The upper die unit 4 is attached to the lower end face of the fixed shaft 2 with the heat insulating block 3 made of a ceramic material. The upper die unit 4 is comprised of a die plate 5 made of metal, an upper die 6 made of ceramic, and a fixed die 7. The lower die unit 11 is attached to the upper end face of the moving shaft 9 with the heat insulating block 10 made of a ceramic material. The lower die unit 11 is comprised of a die plate 12 made of metal, a lower die 13 made of ceramic, and a moving die 14.

The upper and lower die units 4 and 11 which form a pair, the heat insulating blocks 3 and 10, the lower end of the fixed shaft 2, and the upper end of the moving shaft 9 are surrounded by the transparent quartz tube 16. Hence, the forming chamber 17 which is airtight against the outside is formed inside the transparent quartz tube 16. Thermocouples 27a and 27b are respectively attached to the fixed die 7 and moving die 14. The thermocouples 27a and 27b detect the temperatures of the upper and lower die units 4 and 11.

Light-shielding rings 45 and 46 are respectively arranged around the heat insulating blocks 3 and 10. Cooling water paths 47 and 48 are respectively formed in upper and lower plates 15 and 1a.

A lamp unit 19 is arranged along the outer surface of the transparent quartz tube 16. The upper and lower die units 4 and 11 located inside the transparent quartz tube 16 are heated by radiation from the lamp unit 19. The lamp unit 19 is comprised of the plurality of infrared lamps 20, the reflecting mirror 21, a water-cooled pipe 22, the cooling gas jacket 31, an upper flange 37, and a lower flange 38.

The infrared lamps 20 are mounted at the middle stage of the lamp unit 19, and the reflecting mirror 21 is arranged behind the infrared lamps 20. Both the infrared lamps 20 and reflecting mirror 21 are formed by stacking in a plurality of stages ring-like components each constituted by mating two semicircular arcuate elements, to form a cylindrical shape as a whole. An annular space 33 is formed between the outer surface of the transparent quartz tube 16 and the front surface of the reflecting mirror 21.

The cooling gas jacket 31 is attached to cover the rear surface of the reflecting mirror 21. The cooling gas jacket 31 also forms a cylindrical shape as a whole. In this case, the cooling gas is compressed air. The water-cooled pipe 22 is attached inside the jacket 31 along the rear surface of the reflecting mirror 21. A gas inlet port 34 for feeding a cooling gas into the jacket 31 is formed in the outer surface of the jacket 31. The plurality of through holes 35 are formed in the inner-diameter side wall surface of the jacket 31 and the reflecting mirror 21 to extend from the interior of the jacket 31 to reach the front surface of the reflecting mirror 21.

The upper and lower end faces of the reflecting mirror 21 and of the jacket 31 are respectively connected to the upper flange 37 and lower flange 38. The lamp unit 19 is connected to the upper plate 15 with the upper flange 37, and to the lower plate 1a with the lower flange 38. The upper and lower flanges 37 and 38 respectively have gas discharge holes 41 and 42 for discharging the cooling gas from the annular space 33 formed around the transparent quartz tube 16. Furthermore, gas inlet ports 43 and 44 are formed respectively near the upper end face of the upper flange 37 and near the lower end face of the lower flange 38 to spray the cooling gas toward the upper and lower ends of the transparent quartz tube 16.

The compressed cooling air is fed from a blower 51 into the jacket 31 through the gas inlet port 34. The compressed air is sprayed from the jacket 31 into the annular space 33 through the through holes 35. The sprayed compressed air flows through the gaps among the infrared lamps 20 adjacent to each other in the vertical direction, and reaches the outer surface of the transparent quartz tube 16. In this manner, the reflecting mirror 21, the quartz bulbs constituting the envelopes of the infrared lamps 20, and the transparent quartz tube 16 are cooled by the compressed air.

Part of the compressed cooling air is sprayed into the annular space 33 through the gas inlet ports 43 and 44 and is used to cool the vicinities of the upper and lower ends of the transparent quartz tube 16.

The compressed air which has reached the outer surface of the transparent quartz tube 16 flows upward or downward along the outer surface of the transparent quartz tube 16 and is discharged through the gas discharge holes 41 and 42. The compressed air discharged from the annular space 33 is fed to a heat exchanger 53 through discharge lines 52, is cooled there, and is discharged outside the machine.

With the press forming machine for optical devices described above, even when the outputs from the infrared lamps 20 are increased to realize a forming temperature of 1,000° C. or more, overheating of the transparent quartz tube 16, the quartz bulb portion of the infrared lamps 20, and the reflecting mirror 21 can be prevented. Hence, the material with a high glass transition point can be heated to a temperature at which it can be press-formed, without damaging the transparent quartz tube 16, the quartz bulb portions of the infrared lamps 20, and the reflecting mirror 21. As a result, a silica glass optical device can be formed to final shapes by press forming.

As described above, according to the press forming machine of the present invention, a manufacturing process for a silica glass high-precision optical device can be simplified to enable mass production, so that the manufacturing cost of the optical device can be reduced.

Second Embodiment

Figure 2:
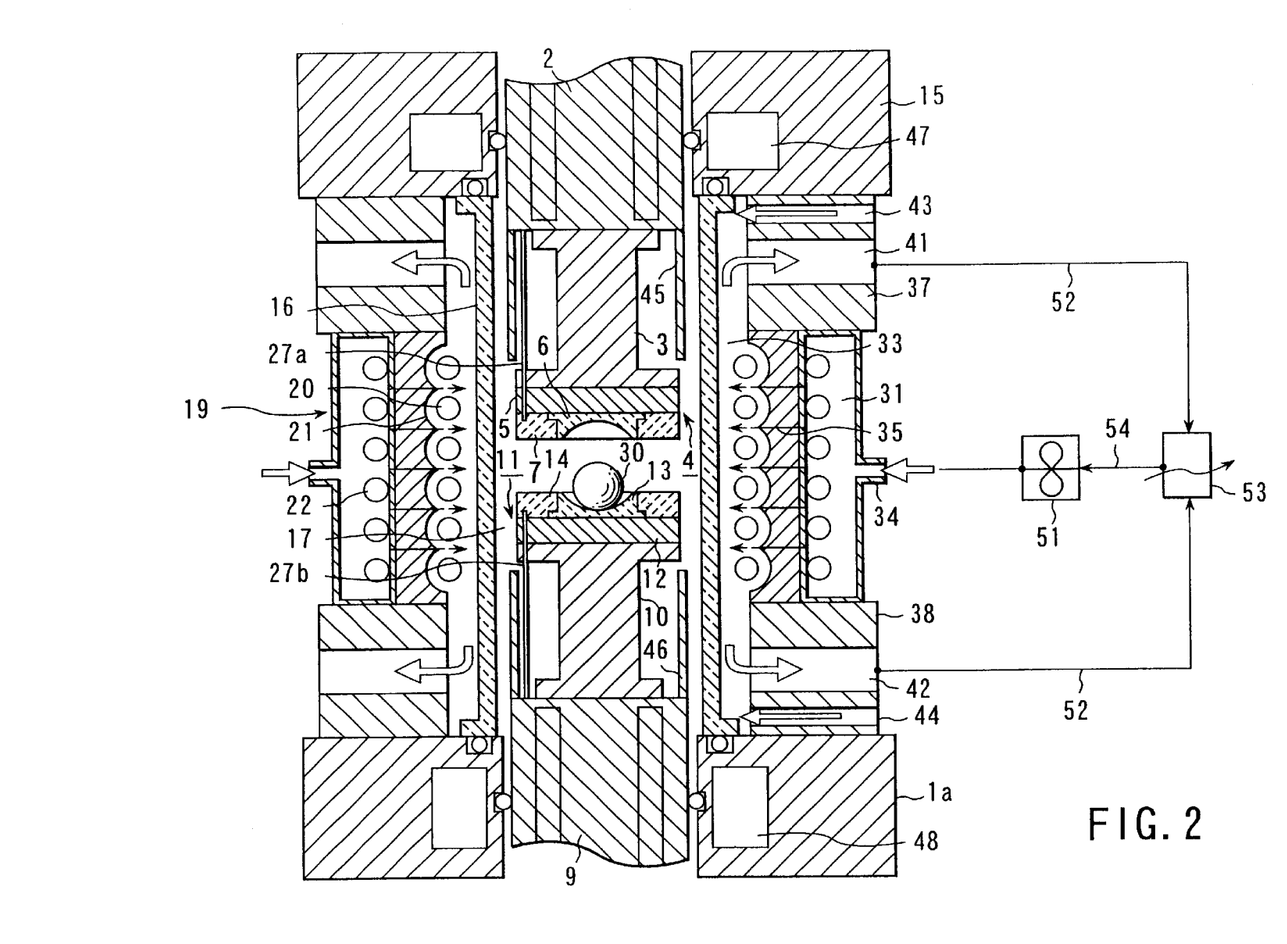
FIG. 2 shows the schematic view of the main part of a press forming machine for optical devices according to another embodiment of the present invention.

FIG. 2 shows a press forming machine for optical devices according to another embodiment of the present invention.

In this embodiment, the compressed gas discharged from an annular space 33 is fed to a heat exchanger 53 through discharge lines 52, and is cooled there. The compressed gas output from the heat exchanger 53 is returned to a blower 51 through a circulating line 54, is compressed there, and is fed into a jacket 31 again. Except for this, the arrangement of the second embodiment is identical to that of the embodiment described above (FIG. 1).

With this arrangement, a high-temperature gas discharged from the annular space 33 can be prevented from contaminating the atmosphere around the machine. When the machine is installed in a clean room, this arrangement is particularly effective for maintaining the atmosphere in the clean room. This arrangement is also effective when a gas other than air, e.g., an inert gas, is used as the cooling gas.

Third Embodiment

Figure 3:
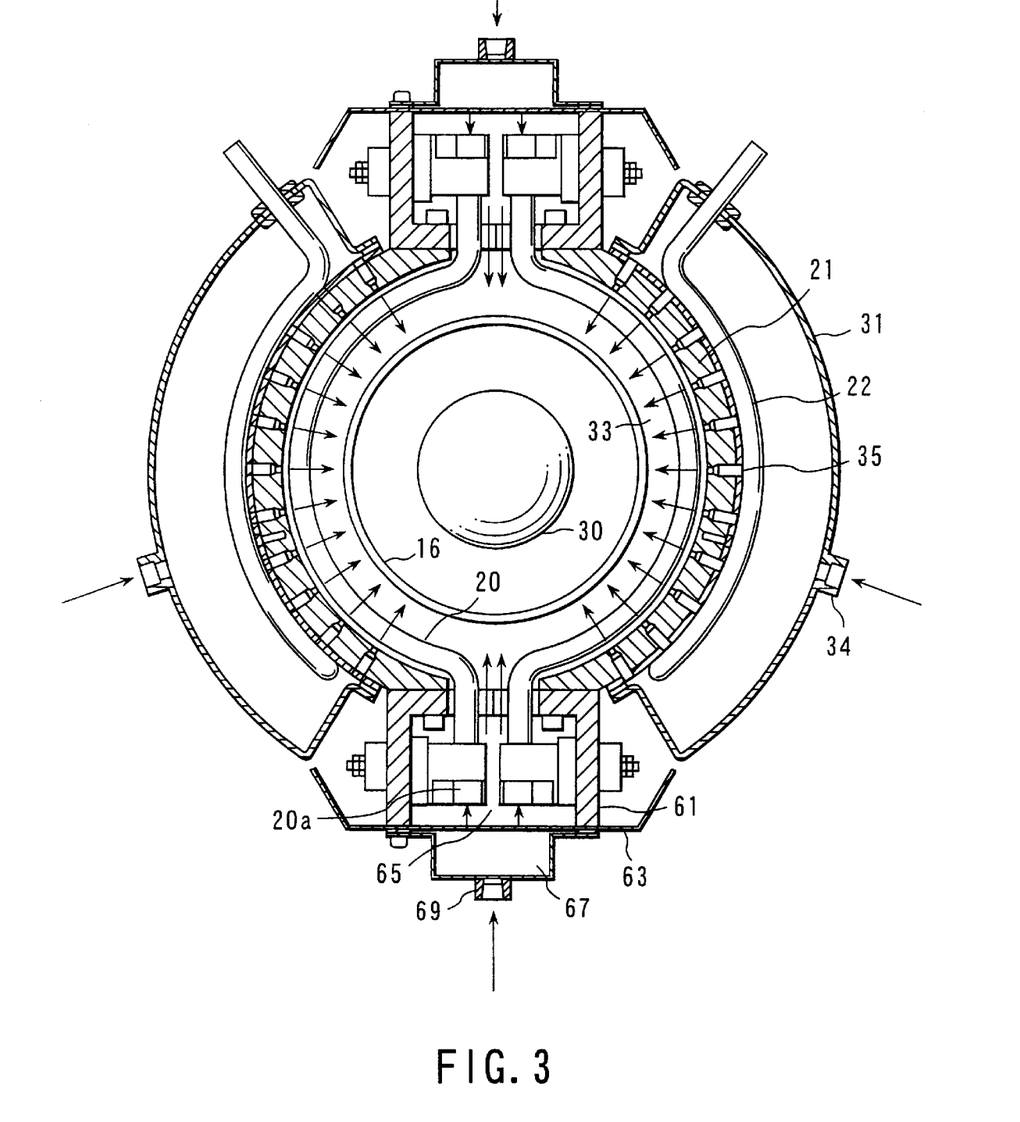
FIG. 3 is a cross-sectional view of a press forming machine for optical devices according to still another embodiment of the present invention.

FIG. 3 is a cross-sectional view of a press forming machine for optical devices according to still another embodiment of the present invention.

A cooling gas jacket 31 is attached to the rear surface of a reflecting mirror 21. The arrangement of the jacket 31 portion is identical to those of the two embodiments described above, and a detailed description thereof will accordingly be omitted. In this embodiment, in addition to this, in order to cool terminal portions 20a of infrared lamps 20, terminal chambers 65 are provided around them in the following manner.

Similarly to the above cases (FIGS. 1, 2, and 5), the infrared lamps 20 and reflecting mirror 21 are formed by stacking in a plurality of stages ring-like components each constituted by mating two semicircular arcuate elements, to form a cylindrical shape as a whole. The two ends in the circumferential direction of each of the semicircular arcade components which constitute the reflecting mirror 21 are respectively connected to terminal bases 61 with L-shaped sections. The base portions of the terminal bases 61 are fixed to the rear surfaces of the edges of the reflecting mirror 21, and the remaining portions thereof project from the rear surface of the reflecting mirror 21 to the outside. The terminal portions 20a of the infrared lamps 20 are fixed to the projecting portions of the terminal bases 61. The infrared lamps 20 extend outside the edges of the base portions of the terminal bases 61 and are introduced into an annular space 33 formed inside the reflecting mirror 21.

A cover plate 63 is attached to the distal ends of the projecting portions of the two terminal bases 61 which are adjacent to each other in the circumferential direction. This forms the terminal chamber 65 with a rectangular section which is defined by the two terminal bases 61 and the cover plate 63. The terminal chamber 65 houses the terminal portions 20a of the infrared lamps 20. A cooling gas jacket 67 is attached to the outer surface of each cover plate 63, and a gas inlet port 69 is formed in the outer surface of the jacket 67.

A cooling gas is supplied into the jacket 67 through its gas inlet port 69. The cooling gas in the jacket 67 flows through through holes formed in the cover plate 63 and is sprayed toward the terminal portions 20a of the infrared lamps 20 to cool them. Then, the cooling gas flows from the terminal chamber 65 to enter the annular space 33 through the gap between the bases of the two terminal bases 61, then flows along the outer surface of a transparent quartz tube 16, and is discharged through gas discharge holes 41 and 42 (FIGS. 1 and 2).

Synthetic silica glass T-4040 (manufactured by Toshiba Ceramics, glass transition point: 1,660° C.) was press-formed by using the above machine to manufacture an optical lens. The forming conditions were use of a spherical preform (diameter: 10 mm), the forming temperature of 1,400° C., and the press force of 800 kgf (7,840 N). As the heat source, a lamp unit was used which was formed of a total of 12 infrared lamps stacked in 6 stages of ring-like components each constituted by mating two semicircular arcuate infrared lamps each with an output of 4 kW (380V). As the transparent quartz tube 16, one made of molten silica glass T-2030 (manufactured by Toshiba Ceramics) was used.

As a result, it was confirmed that a silica glass optical lens could be stably formed without damaging the transparent quartz tube 16, the quartz bulb portions of the infrared lamps 20, and the reflecting mirror 21.

Fourth Embodiment

Figure 4:
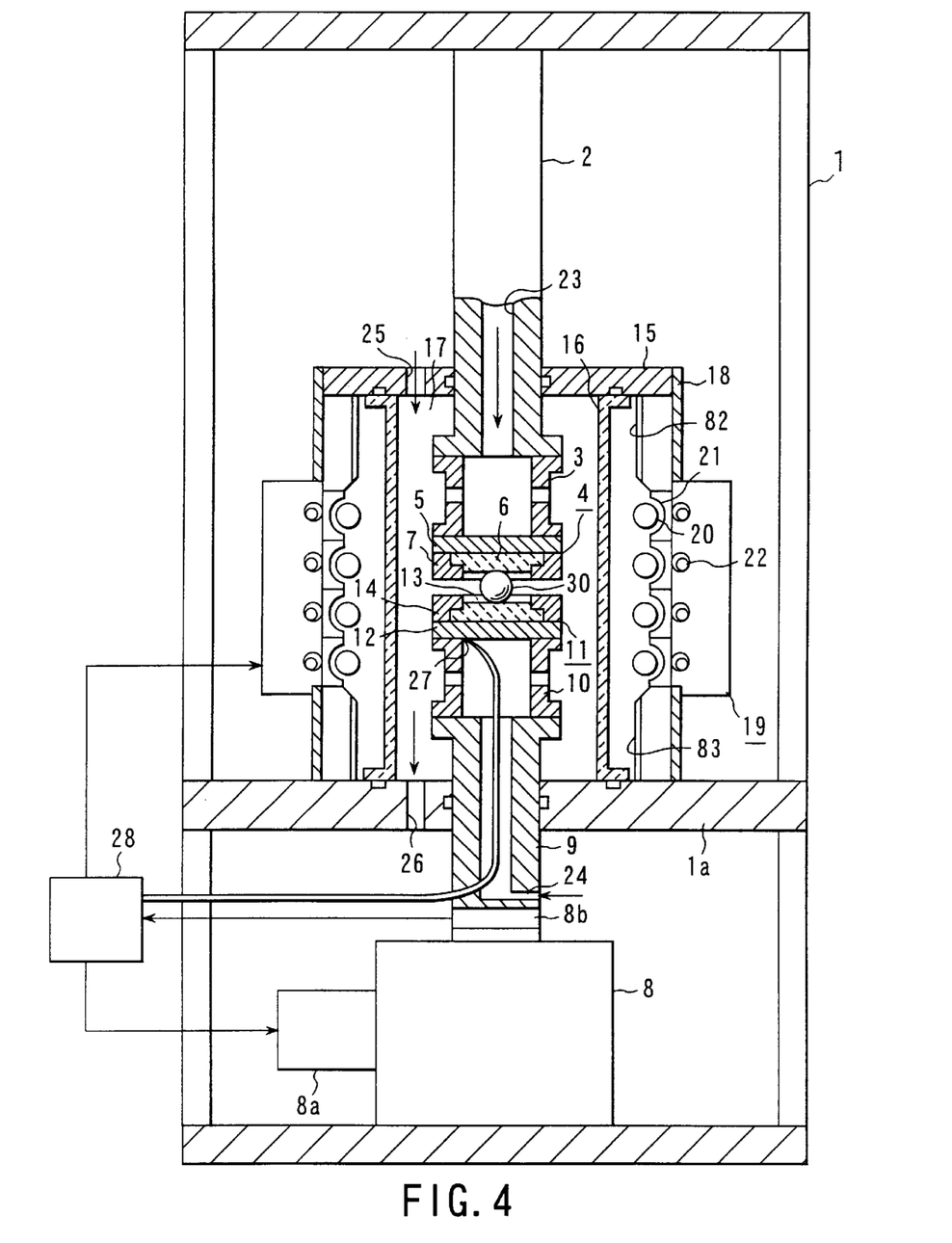
FIG. 4 is a schematic view of a press forming machine for optical devices according to still another embodiment of the present invention.

FIG. 4 is a view showing the schematic view of a press forming machine for optical devices according to still another embodiment of the present invention. In FIG. 4, reference numeral 82 denotes a second reflecting mirror; and 83, a third reflecting mirror.

The difference between the machine shown in FIG. 4 and that of the conventional machine (FIG. 5) described above resides in that the machine shown in FIG. 4 has the second and third reflecting mirrors 82 and 83. Except for this, the arrangement of the machine is common between this embodiment and the conventional machine. The common elements are denoted by the same reference numerals, and a detailed description thereof will be omitted.

In the press forming machine of this embodiment, the second reflecting mirror 82 is provided at a portion extending from the upper end of a first reflecting mirror 21 to the lower surface of an upper plate 15 so as to surround the outer surface of a transparent quartz tube 16. Similarly, the third reflecting mirror 83 is provided at a portion extending from the lower end of the first reflecting mirror 21 to the upper surface of a lower plate 1a so as to surround the outer surface of the transparent quartz tube 16. Each of the second and third reflecting mirrors 82 and 83 has a cylindrical shape as a whole.

In this manner, of the outer surface of the transparent quartz tube 16, those portions which are adjacent to the upper and lower ends are not surrounded by the infrared lamps 20 and first reflecting mirror 21. The second and third reflecting mirrors 82 and 83 are arranged around these portions so that the transparent quartz tube 16 is surrounded by reflecting mirrors (21, 82, and 83) without a gap throughout its entire length.

Hence, the heat decreases which is radiated from the vicinities the distal ends of a fixed shaft 2 and moving shaft 9, transmitted through the transparent quartz tube 16, and dissipated outside a forming chamber 17, and the heat insulating properties in the forming chamber 17 are improved. As a result, the atmosphere temperature in the forming chamber 17 can be maintained high more easily than in the conventional machine, and an optical device can be formed of silica glass (glass transition point; 1,300° C. to 1,600° C.) by press forming.

Synthetic silica glass T-4040 (manufactured by Toshiba Ceramics, glass transition point: 1,660° C.) was press-formed by using the machine shown in FIG. 4 to manufacture an optical lens (lens diameter: 30 mm). The forming conditions were use of a spherical preform (diameter: 15 mm), the forming temperature of 1,400° C., and the press force of 800 kgf (7,840 N). As the heat source, a lamp unit was used which was formed of a total of 12 infrared lamps stacked in 6 stages of ring-like components each constituted by mating two semicircular arcuate infrared lamps each with an output of 4 kW (380V). As the transparent quartz tube 16, one made of molten silica glass T-2030 (manufactured by Toshiba Ceramics) was used.

As a result, it was confirmed that an optical lens could be stably formed without causing cracking in the preform.

For the sake of comparison, synthetic silica glass was press-formed by using the conventional machine shown in FIG. 5 with the same conditions as those described above. In this case, although the temperature of the die reached 1,400° C., the temperature of the preform rose to about 1,200° C. at most, and a state wherein press forming was possible was not reached. As a result, when a press load was applied, cracking occurs in the preform, and an optical lens could not be formed.

According to the press forming machine for optical devices described above, since the heat insulating properties in the forming chamber are improved, a material with a high glass transition point, e.g., silica glass, can be heated to a temperature where it can be press-formed. Therefore, this preform can be formed into a final shape by press forming.

As a result, a manufacturing process for a silica glass high-precision optical device can be simplified to enable mass production, so that the manufacturing cost of the optical device can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A press forming machine for optical devices, which heats a material to be formed and thereafter forms the material, thereby manufacturing an optical device, comprising:
   a pair of upper and lower press dies for forming the material;
   a pair of upper and lower shafts for respectively supporting said press dies from behind;
   a cylindrical member surrounding said pair of press dies and distal ends of said shafts to form an airtight chamber therein, said cylindrical member being made of a material transparent to infrared rays;
   infrared lamps arranged along an outer surface of said cylindrical member to surround said pair of press dies;
   a reflecting mirror arranged behind said infrared lamps to form a cylindrical shape as a whole; and
   a jacket attached to cover a rear surface of said reflecting mirror and supplied with a cooling gas,
   wherein said reflecting mirror has a plurality of through holes through which the cooling gas is sprayed from said jacket toward the outer surface of said cylindrical member.

2. A machine according to claim 1, further comprising:
   a recovery line for recovering the cooling gas sprayed toward said outer surface of said cylindrical member from both ends of said cylindrical member;
   a heat exchanger for cooling the cooling gas thus recovered; and
   a discharge line for discharging the cooled gas thus recovered to an outside of said machine.

3. A machine according to claim 1, further comprising:
   a recovery line for recovering the cooling gas sprayed toward said outer surface of said cylindrical member from both ends of said cylindrical member;
   a heat exchanger for cooling the cooling gas thus recovered; and
   a circulating line for circulating the cooled gas thus recovered within said jacket.

4. A machine according to claim 1, further comprising:
   a terminal chamber for housing terminal portions of said infrared lamps,
   wherein said terminal portions are cooled by supplying a cooling gas into said terminal chamber.

5. A press forming machine for heating a material to be formed and thereafter forming the material, thereby manufacturing a formed product, comprising:
   a pair of upper and lower press dies for forming the material;
   a pair of upper and lower shafts for respectively supporting said press dies from behind;
   a cylindrical member surrounding said pair of press dies and distal ends of said shafts to form an airtight chamber therein, said cylindrical member being made of a material transparent to infrared rays;
   infrared lamps arranged along an outer surface of said cylindrical member to surround said pair of press dies;
   a reflecting mirror arranged behind said infrared lamps to form a cylindrical shape as a whole; and
   a jacket attached to cover a rear surface of said reflecting mirror and supplied with a cooling gas,
   wherein said reflecting mirror has a plurality of through holes through which the cooling gas is sprayed from said jacket toward the outer surface of said cylindrical member.

6. A press forming machine for optical devices, which heats a material to be formed and thereafter forms the material, thereby manufacturing an optical device, comprising:

- a pair of upper and lower press dies for forming the material;
- a pair of upper and lower shafts for respectively supporting said press dies from behind;
- a pair of upper and lower heat insulating members inserted between distal end faces of said shafts and rear surfaces of said press dies to decrease a heat flux flowing out from said press dies through said shafts;
- a cylindrical member surrounding said pair of press dies, said pair of heat insulating members, and distal ends of said shafts to form an airtight chamber therein, said cylindrical member being made of a material transparent to infrared rays;
- upper and lower plates respectively connected to upper and lower ends of said cylindrical member and having through holes at central portions thereof through which said shafts extend slidably through seal members;
- infrared lamps arranged along an outer surface of said cylindrical member to surround said pair of press dies;
- a first reflecting mirror arranged behind said infrared lamps to form a cylindrical shape as a whole;
- a second reflecting mirror arranged to surround said cylindrical member and occupying a range extending from an upper end of said first reflecting mirror to a lower surface of said upper plate to form a cylindrical shape as a whole; and
- a third reflecting mirror arranged to surround said cylindrical member and occupying a range extending from a lower end of said first reflecting mirror to an upper surface of said lower plate to form a cylindrical shape as a whole.

* * * * *